(12) United States Patent
Kim et al.

(10) Patent No.: US 12,561,254 B2
(45) Date of Patent: Feb. 24, 2026

(54) MEMORY DEVICE FOR CONFIGURING MAPPING TABLE AND OPERATING METHOD THEREOF

(71) Applicant: Samsung Electronics Co., Ltd., Suwon-si (KR)

(72) Inventors: Hyunseok Kim, Suwon-si (KR); Joungchan Yim, Suwon-si (KR); Sungjoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/934,498

(22) Filed: Nov. 1, 2024

(65) Prior Publication Data

US 2025/0190359 A1     Jun. 12, 2025

(30) Foreign Application Priority Data

Dec. 12, 2023   (KR) ........................ 10-2023-0180109
Apr. 30, 2024   (KR) ........................ 10-2024-0058131

(51) Int. Cl.
*G06F 12/1009* (2016.01)

(52) U.S. Cl.
CPC .................................. *G06F 12/1009* (2013.01)

(58) Field of Classification Search
CPC ........... G06F 12/1009; G06F 2212/152; G06F 2212/7204; G06F 12/0284; G06F 12/04; G06F 12/0292; G06F 2212/1044; G06F 2212/7201; G06F 3/0604; G06F 3/0638; G06F 3/0679
See application file for complete search history.

(56) References Cited

U.S. PATENT DOCUMENTS

| | | | |
|---|---|---|---|
| 8,527,544 B1 | 9/2013 | Colgrove et al. | |
| 8,886,691 B2 | 11/2014 | Colgrove et al. | |
| 11,263,147 B2 * | 3/2022 | Miura ................. | G06F 12/1009 |
| 2016/0328154 A1 | 11/2016 | Mizushima et al. | |
| 2017/0024153 A1 | 1/2017 | Yeh | |
| 2019/0243582 A1 | 8/2019 | Satoyama et al. | |
| 2019/0278716 A1 | 9/2019 | Cho et al. | |
| 2020/0371952 A1 | 11/2020 | Ke | |
| 2022/0269431 A1 | 8/2022 | Ren et al. | |
| 2023/0063123 A1 | 3/2023 | Hyun | |
| 2023/0093247 A1 * | 3/2023 | Kumar ................. | G06F 3/0673 |
| | | | 711/154 |
| 2023/0142767 A1 | 5/2023 | Nakanishi et al. | |
| 2023/0359567 A1 | 11/2023 | Lee et al. | |

(Continued)

*Primary Examiner* — Sean D Rossiter

(74) *Attorney, Agent, or Firm* — Fish & Richardson P.C.

(57)     ABSTRACT

A memory device may include a first main memory configured to store an address mapping table, at least one second main memory configured to store data received from a host device, and a memory controller configured to, compressively convert a host physical address set received from the host device into a device physical address set indicating a range of physical addresses in the at least one second main memory associated with the host physical address set, generate at least one address mapping table entry based on the device physical address set, the at least one address mapping table entry associated with at least one device physical address subset associated with the device physical address set, and store the at least one address mapping table entry in the address mapping table of the first main memory.

20 Claims, 14 Drawing Sheets

(56) References Cited

U.S. PATENT DOCUMENTS

2025/0117138 A1* 4/2025 Erickson ............... G06F 3/0673
2025/0173261 A1* 5/2025 Oh ....................... G06F 12/0871
2025/0238371 A1* 7/2025 Jeong .................. G06F 12/0868

* cited by examiner

START

S100

RECEIVE HOST PHYSICAL ADDRESS SET FROM HOST

S200

COMPRESSIVELY CONVERT HOST PHYSICAL ADDRESS
SET INTO DEVICE PHYSICAL ADDRESS SET

S300

GENERATE, BASED ON DEVICE PHYSICAL ADDRESS SET,
AT LEAST ONE ADDRESS MAPPING TABLE ENTRY
INCLUDING DEVICE PHYSICAL ADDRESS SUBSET

S400

STORE AT LEAST ONE ADDRESS MAPPING
TABLE ENTRY IN MAIN MEMORY

END

S310

GENERATE FIRST ADDRESS MAPPING TABLE ENTRY
INCLUDING FIRST DEVICE PHYSICAL ADDRESS SUBSET

S320

GENERATE SECOND ADDRESS MAPPING TABLE ENTRY
INCLUDING SECOND DEVICE PHYSICAL ADDRESS SUBSET

FIG. 14

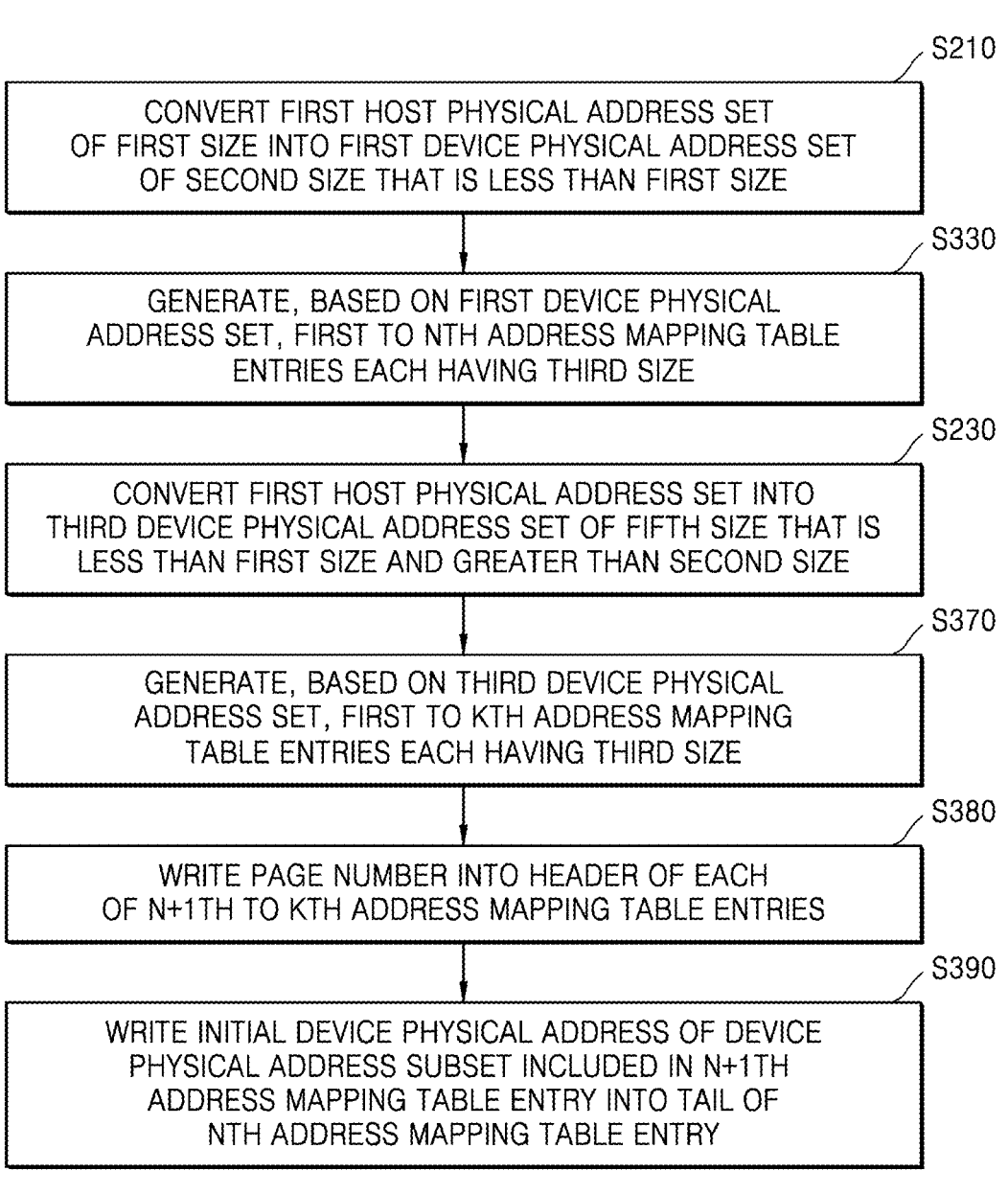

S210

CONVERT FIRST HOST PHYSICAL ADDRESS SET
OF FIRST SIZE INTO FIRST DEVICE PHYSICAL ADDRESS SET
OF SECOND SIZE THAT IS LESS THAN FIRST SIZE

S330

GENERATE, BASED ON FIRST DEVICE PHYSICAL
ADDRESS SET, FIRST TO NTH ADDRESS MAPPING TABLE
ENTRIES EACH HAVING THIRD SIZE

S230

CONVERT FIRST HOST PHYSICAL ADDRESS SET INTO
THIRD DEVICE PHYSICAL ADDRESS SET OF FIFTH SIZE THAT IS
LESS THAN FIRST SIZE AND GREATER THAN SECOND SIZE

S370

GENERATE, BASED ON THIRD DEVICE PHYSICAL
ADDRESS SET, FIRST TO KTH ADDRESS MAPPING
TABLE ENTRIES EACH HAVING THIRD SIZE

S380

WRITE PAGE NUMBER INTO HEADER OF EACH
OF N+1TH TO KTH ADDRESS MAPPING TABLE ENTRIES

S390

WRITE INITIAL DEVICE PHYSICAL ADDRESS OF DEVICE
PHYSICAL ADDRESS SUBSET INCLUDED IN N+1TH
ADDRESS MAPPING TABLE ENTRY INTO TAIL OF
NTH ADDRESS MAPPING TABLE ENTRY

MEMORY DEVICE FOR CONFIGURING MAPPING TABLE AND OPERATING METHOD THEREOF

CROSS-REFERENCE TO RELATED APPLICATIONS

This U.S. non-provisional application is based on and claims the benefit of priority under 35 U.S.C. § 119 to Korean Patent Application Nos. 10-2023-0180109, filed on Dec. 12, 2023, and 10-2024-0058131, filed on Apr. 30, 2024, in the Korean Intellectual Property Office, the disclosures of each of which are incorporated by reference herein in their entireties.

BACKGROUND

Some example embodiments of the inventive concepts relate to an electronic device, and more particularly, to a memory device capable of configuring a mapping table, a system including the memory device, and/or an operating method thereof.

Semiconductor memories are widely used to store data in various electronic devices, such as computers, wireless communication devices, and the like. As a type of semiconductor memory, dynamic random-access memory (DRAM) operates writes data by storing charges in a cell capacitor of a memory cell.

As data size has continually increased, in order to store more data in DRAM, a method of physically increasing the amount of storage space of the DRAM (e.g., increasing the number of memory cells in the DRAM) has been generally used. However, there are limitations in physically increasing the storage space of the DRAM. Accordingly, research on technology for expanding the storage space of DRAM without physically increasing the storage space of the DRAM has been conducted.

SUMMARY

Some example embodiments of the inventive concepts provide a memory device capable of configuring an address mapping table to reduce a garbage area, a system including the memory device, and/or an operating method of the memory device, etc.

According to at least one example embodiment of the inventive concepts, there is provided a memory device including a first main memory configured to store an address mapping table, at least one second main memory configured to store data received from a host device, and a memory controller configured to, compressively convert a host physical address set received from the host device into a device physical address set including a plurality of device physical addresses in the at least one second main memory, generate at least one address mapping table entry associated with at least one device physical address subset of the device physical address set, based on the device physical address set, and store the at least one address mapping table entry in the address mapping table of the first main memory, each of the at least one address mapping table entry including, a header indicating a page number of an allocated page among a plurality of pages included in the first main memory or a deallocation of the allocated page, a mapping table number corresponding to the host physical address set, a current device physical address subset stored in the allocated page, and a tail indicating an initial device physical address of a subsequent device physical address subset to be read after the current device physical address subset or an end of the device physical address set.

According to at least one example embodiment of the inventive concepts, there is provided an operating method of a memory device, the operating method including receiving a host physical address set from a host device, compressively converting the host physical address set into a device physical address set including a plurality of device physical addresses in at least one first main memory, and generating at least one address mapping table entry associated with at least one device physical address subset of the device physical address set, based on the device physical address set, each of the at least one address mapping table entry including, a header indicating a page number of an allocated page among a plurality of pages included in in a second main memory or a deallocation of the allocated page, a mapping table number corresponding to the host physical address set, a current device physical address subset stored in the allocated page, and a tail indicating an initial device physical address of a subsequent device physical address subset to be read after the current device physical address subset or an end of the device physical address set.

According to at least one example embodiment of the inventive concepts, there is provided a memory device including at least one memory module connected to a channel, and a controller including a main memory, the main memory configured to store an address mapping table, the controller configured to, compressively convert a host physical address set received from a host device into a device physical address set including a plurality of device physical addresses in the main memory, generate at least one address mapping table entry associated with at least one device physical address subset of the device physical address set, based on the device physical address set, and store the at least one address mapping table entry in the main memory, each of the at least one address mapping table entry including, a header indicating a page number of an allocated page among a plurality of pages included in in the main memory or a deallocation of the allocated page, a mapping table number corresponding to the host physical address set, a current device physical address subset stored in the allocated page, and a tail indicating an initial device physical address of a subsequent device physical address subset to be read after the current device physical address subset or an end of the device physical address set.

BRIEF DESCRIPTION OF THE DRAWINGS

Some example embodiments will be more clearly understood from the following detailed description taken in conjunction with the accompanying drawings in which:

FIG. 14 is a flowchart of the operating method of FIG. 10 according to at least one example embodiment.

DETAILED DESCRIPTION

Hereinafter, some example embodiments of the inventive concepts will be described in detail with reference to the accompanying drawings.

Figure 1:
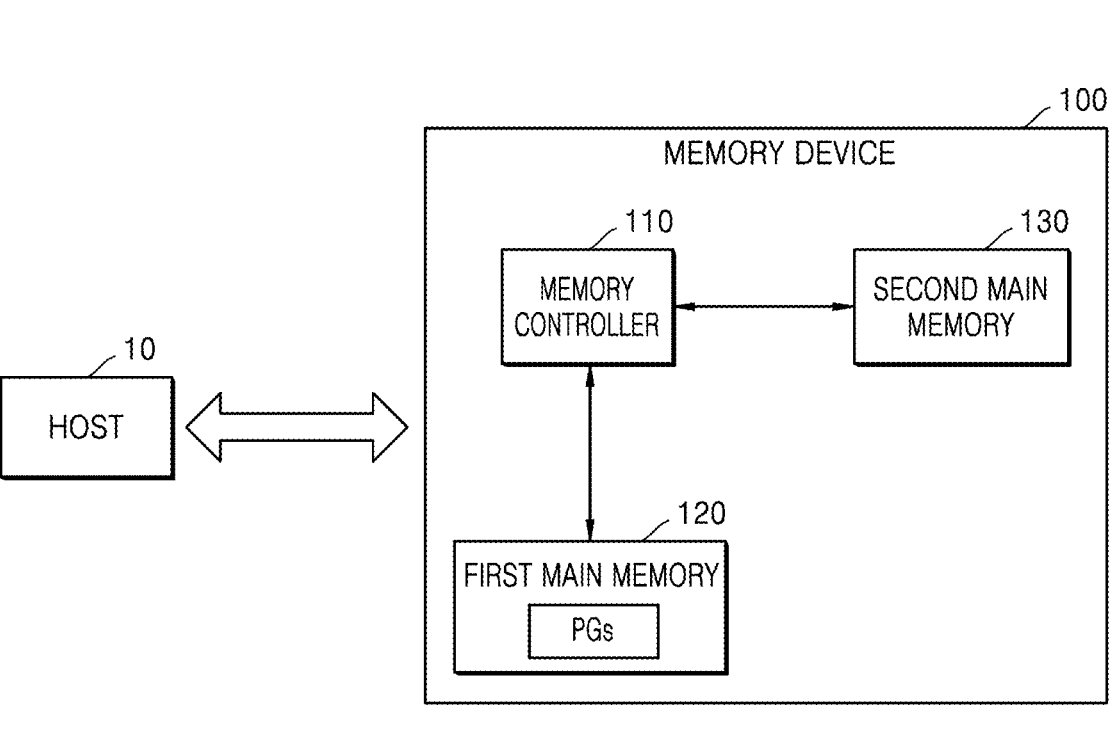
FIG. 1 is a block diagram illustrating a memory system according to at least one example embodiment.

FIG. 1 is a block diagram illustrating a memory system 1 according to at least one example embodiment.

Referring to FIG. 1, the memory system 1 may include at least one host 10 (e.g., a host device, etc.) and/or at least one memory device 100, but the example embodiments are not limited thereto, and for example, the memory system 1 may include a greater or lesser number of constituent components, etc.

The host 10 may communicate with the memory device 100 through at least one interface. The host 10 may send and/or transmit at least one write request to the memory device 100 requesting storage of data in the memory device 100. Also, the host 10 may send and/or transmit data to be stored in the memory device 100 and a host physical address for identifying and/or corresponding to the data to be stored to the memory device 100, but is not limited thereto. The host 10 may send and/or transmit at least one read request to the memory device 100 requesting the memory device 100 to read, return, retrieve, and/or provide data stored therein. Also, the host 10 may send a host physical address to the memory device 100, the host physical address for identifying the data to be read from the memory device 100. In some example embodiments, the host physical address may be included in the read request. The host 10 may be implemented as and/or include a processor (e.g., processing circuitry), such as a central processing unit (CPU), an application processor (AP), a system-on-a-chip (SoC), or the like, and may process data, instructions, commands, etc. The host 10 may execute an operating system (OS) and/or various applications. The host 10 may include a physical layer, a multi-protocol multiplexer, interface circuits, a coherence/cache circuit, a bus circuit, at least one core, and/or at least one input/output device, etc., but is not limited thereto.

In at least one example embodiment, the host 10 may send at least one host physical address to the memory device 100. A certain and/or desired number of host physical addresses may be referred to as a host physical address set having a certain and/or desired size.

The memory device 100 may include a memory controller 110 and/or a plurality of main memory, e.g., a first main memory 120, and/or a second main memory 130, etc., but is not limited thereto, and for example, may include a greater or number of memories, etc.

The memory controller 110 (e.g., processing circuitry, etc.) may control main memory to write data to the main memory and/or read data stored in the main memory, in response to access and/or request by the host 10.

In at least one example embodiment, the memory controller 110 may compressively convert a host physical address set received from the host 10 into a device physical address set, or in other words, the memory controller 110 may convert and compress into a smaller data size the host physical address set into the device physical address set. The device physical address set may correspond to a storage space of the second main memory 130, but is not limited thereto. The memory controller 110 may generate, based on the device physical address set, at least one address mapping table entry including a device physical address subset. The memory controller 110 may store the at least one address mapping table entry in the first main memory 120. For example, the memory controller 110 may receive at least one host physical address from the host 10 and may convert the host physical address into a device physical address. In at least one example embodiment, the memory controller 110 may compressively convert (e.g., convert and compress into a smaller file size, etc.) a host physical address set of a first size into a device physical address set of a second size, etc. The second size may be less than the first size. It is assumed that a device physical address set of a certain and/or desired size represents a certain and/or desired number of device physical addresses, or in other words, the device physical address set may be associated with and/or correspond to a plurality of device physical addresses and/or a range of device physical addresses. The memory controller 110 may divide the device physical address set of the second size into at least one device physical address subset and generate at least one address mapping table entry, but is not limited thereto. One address mapping table entry may include one device physical address subset, but is not limited thereto. An address mapping table entry may include data indicating a mapping relationship (e.g., conversion information, etc.) between a host physical address and a device physical address. When the memory controller 110 generates at least one address mapping table entry during one write operation, the memory controller 110 may update the at least one address mapping table entry during a rewrite operation, but the example embodiments are not limited thereto.

The first main memory 120 and the second main memory 130 may each be implemented as a volatile memory, but the example embodiments are not limited thereto, and for example, one or more of the main memories may be a non-volatile memory. The volatile memory may be, for example, static random-access memory (RAM) (SRAM), dynamic RAM (DRAM), mobile DRAM, double data rate (DDR) synchronous DRAM (SDRAM), low power DDR (LPDDR) SDRAM, graphic DDR (GDDR) SDRAM, Rambus DRAM (RDRAM), or the like. In at least one example embodiment, the first main memory 120 and the second main memory 130 may each be implemented as DRAM. However, the example embodiments of the inventive concepts are not limited thereto. The first main memory 120 and the second main memory 130 may each include at least one page. For example, the first main memory 120 may include a plurality of pages PGs. The size of one page may be, for example, 4 kilobytes (KB), but is not limited thereto.

The first main memory 120 may store at least one address mapping table entry. The size of an address mapping table entry may be less than the size of a device physical address set, but is not limited thereto.

The second main memory 130 may store data received from the host 10. The second main memory 130 may store (e.g., write) the data in a storage space corresponding to a device physical address based on a write command of the memory controller 110 and the device physical address. The second main memory 130 may output data stored in the storage space to the memory controller 110 based on a read command of the memory controller 110 and the device physical address.

According to at least one example embodiment, by linking address mapping table entries to each other, a garbage region of a memory may be reduced, or in other words, the file size of a garbage region of memory may be decreased, etc.

Also, according to at least one example embodiment, by compressing an address, a storage space of the memory may be increased and/or manufacturing costs of the memory may be reduced, without physically changing the architecture of the memory (e.g., physically increasing the number of memory cells included in the memory device, etc.).

Figure 2:
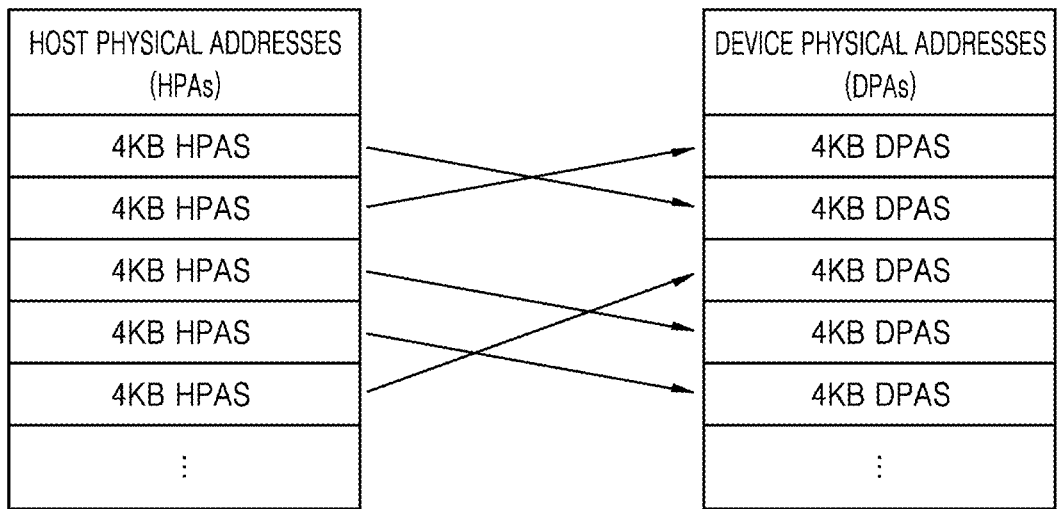
FIG. 2 is a diagram illustrating address mapping according to at least one example embodiment.

FIG. 2 is a diagram illustrating address mapping according at least one example embodiment.

Referring to FIGS. 1 and 2, in at least one example embodiment, the memory controller 110 may convert a host physical address set HPAS of a first size (e.g., a first desired size) into a device physical address set DPAS of the first size (e.g., the first desired size), but is not limited thereto. The host physical address set HPAS and the device physical address set DPAS may have a one-to-one correspondence with each other. In this regard, the first size may be, for example, 4 KB, but the example embodiments of the inventive concepts are not limited thereto, and other sizes may be used.

Recently, as the size of data has increased, in order to store more data in a main memory (e.g., the second main memory 130), a method of physically increasing the storage space of the main memory has been generally used. However, as the size of data increases, the size and/or number of host physical addresses also increases. As the size and/or number of host physical addresses increases, the size and/or number of device physical addresses, which are mapped such that there is a one-to-one size correspondence with the host physical addresses, increases, and thus, the storage space of the main memory also needs to physically increase. There are limitations in physically expanding the storage space of the main memory. Accordingly, as at least one example embodiment of storing more data in a main memory without physically expanding a storage space of the main memory, the memory controller 110 may compress data received from the host 10 and store the compressed data in a main memory (e.g., the second main memory 130). In this regard, the memory controller 110 may also compress the size of the device physical address set DPAS, to reduce and/or eliminate the need to expand the physical size of the main memory and/or add more main memory, etc.

Figure 3:
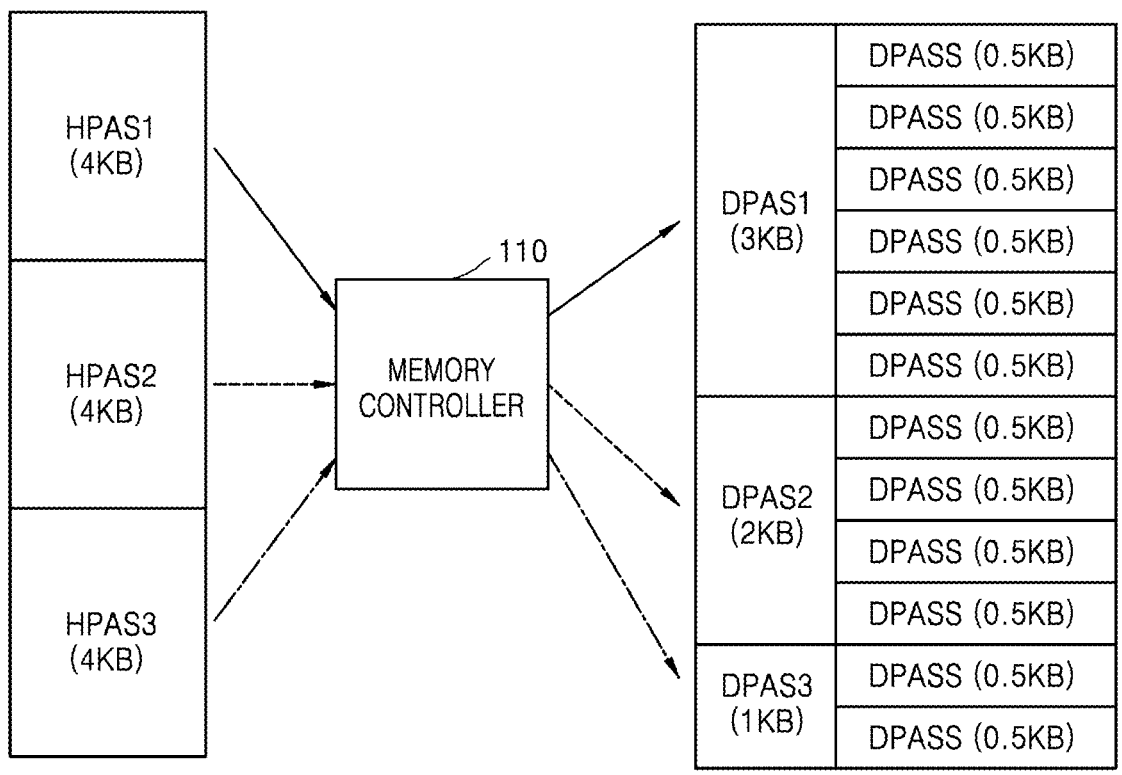
FIG. 3 is a diagram illustrating address compressing according to at least one example embodiment.

FIG. 3 is a diagram illustrating address compressing according to at least one example embodiment.

Referring to FIGS. 1 and 3, in at least one example embodiment, the memory controller 110 may receive host physical addresses of a certain size (e.g., a desired size, etc.) from the host 10 and gather the host physical addresses into a host physical address set in units of a first size (e.g., the first desired size, etc.). For example, the certain size that each host physical address has may be 64 bytes (B), and the first size that each of first to third host physical address sets HPAS1, HPAS2, and HPAS3 has may be 4 KB. However, the example embodiments of the inventive concepts are not limited thereto, and other sizes may be used. Although FIG. 3 shows three host physical address sets HPAS, the number of host physical address sets is not limited to that shown in FIG. 3.

The memory controller 110 may convert a host physical address set HPAS of the first size into a device physical address set DPAS of a size less than the first size. For example, the memory controller 110 may convert the first host physical address set HPAS1 of 4 KB into a first device physical address set DPAS1 of 3 KB, but the example embodiments are not limited thereto. As another example, the memory controller 110 may convert the second host physical address set HPAS2 of 4 KB into a second device physical address set DPAS2 of 2 KB, etc. As another example, the memory controller 110 may convert the third host physical address set HPAS3 of 4 KB into a third device physical address set DPAS3 of 1 KB, etc. The size of each of the first to third device physical address sets DPAS1, DPAS2, and DPAS3 may be changed for each write operation. For example, when a write operation is performed on the first host physical address set HPAS1, the size of the first device physical address set DPAS1 may be compressed to 3 KB, as shown in FIG. 3. Afterwards, when a write operation is performed once again on the first host physical address set HPAS1, the size of the first device physical address set DPAS1 may be compressed to a size less than 4 KB, such as 2 KB, 1 KB, or the like.

The device physical address set DPAS may include device physical address subsets each having a certain size. The device physical address subsets may have the same size, for example, 0.5 KB or 1 KB, but the example embodiments of the inventive concepts are not limited thereto, and for example, different sizes may be used. Referring to FIG. 3, for example, the first device physical address set DPAS1 of 3 KB may include six device physical address subsets DPASS each having a size of 0.5 KB, but the example embodiments are not limited thereto. As another example, the second device physical address set DPAS2 of 2 KB may include four device physical address subsets DPASS each having a size of 0.5 KB, etc. As another example, the third device physical address set DPAS3 of 1 KB may include two device physical address subsets DPASS each having a size of 0.5 KB, etc.

In at least one example embodiment, a device physical address subset may include device physical addresses each having a certain and/or desired size (e.g., 64 B), but the example embodiments are not limited thereto.

Figure 4:
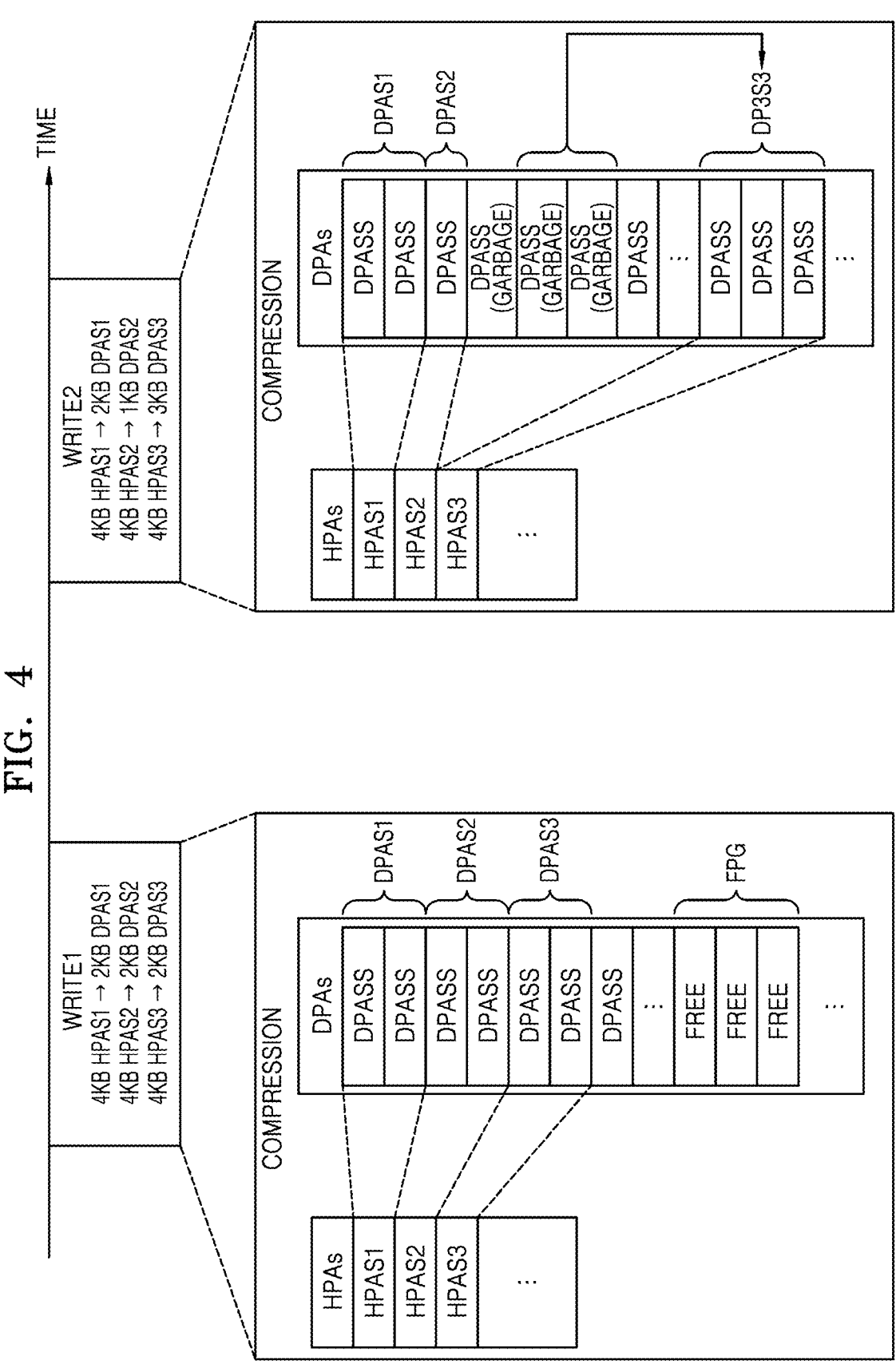
FIG. 4 is a diagram illustrating address recompressing according to at least one example embodiment.

FIG. 4 is a diagram illustrating address recompressing according to at least one example embodiment.

Referring to FIGS. 1 and 4, a plurality of write operations may be performed multiple times over time in the memory device 100. For example, a first write operation WRITE1 may be performed, and after the first write operation WRITE1 is completed, a second write operation WRITE2 may be performed, etc. However, the example embodiments of the inventive concepts are not limited thereto.

In the first write operation WRITE1, for example, a first host physical address set HPAS1 of 4 KB may be converted into a first device physical address set DPAS1 of 2 KB, a second host physical address set HPAS2 of 4 KB may be converted into a second device physical address set DPAS2 of 2 KB, and a third host physical address set HPAS3 of 4 KB may be converted into a third device physical address set DPAS3 of 2 KB, but the example embodiments are not limited thereto. The first to third device physical address sets DPAS1, DPAS2, and DPAS3 may be consecutively stored in the first main memory 120. Each of the first to third device physical address sets DPAS1, DPAS2, and DPAS3 may include device physical address subsets of an equal size (e.g., 0.5 KB, 1 KB, or the like), but are not limited thereto.

In FIG. 4, it is assumed that the size of a device physical address subset is 1 KB, but the example embodiments are not limited thereto.

In the second write operation WRITE2, like in the first write operation WRITE1, the first host physical address set HPAS1 of 4 KB may be converted into a first device physical address set DPAS1 of 2 KB. In contrast, unlike in the first write operation WRITE1, the second host physical address set HPAS2 of 4 KB may be converted into a second device physical address set DPAS2 of 1 KB, and the third host physical address set HPAS3 of 4 KB may be converted into a third device physical address set DPAS3 of 3 KB.

In this regard, when the size of an address compressed in a next (e.g., a subsequent, a future, etc.) write operation (referred to as a "second compression size" for convenience) is less than the size of an address compressed in a previous write operation (referred to as a "first compression size" for convenience), a region storing an address of a size corresponding to the difference between the first compression size and the second compression size may become a garbage region (e.g., a memory region storing garbage data, etc.). Referring to FIG. 4, for example, the size of the second device physical address set DPAS2 in the first write operation WRITE1 may be 2 KB, and the size of the second device physical address set DPAS2 in the second write operation WRITE2 may be 1 KB. Accordingly, a region in which the second device physical address set DPAS2 of 1 KB is stored in the existing second device physical address set DPAS2 of 2 KB may become a garbage region (e.g., the second KB in the region storing the second device physical address set DPAS2 may contain garbage data, etc.).

In some cases, the second compression size may be greater than the first compression size, or in other words, the compression ratio for the second compression size may be lower than the compression ratio for the first compression size, etc. Referring to FIG. 4, for example, the size of the third device physical address set DPAS3 in the first write operation WRITE1 may be 2 KB, and the size of the third device physical address set DPAS3 in the second write operation WRITE2 may be 3 KB, but are not limited thereto. When a new storage space (e.g., a page) for storing a device physical address is allocated, the newly allocated storage space needs to be consecutive with a storage space in which existing device physical addresses are stored. However, when separate device physical addresses are stored in consecutive pages, resources of the memory device 100 may be wasted and/or considerably wasted because the memory controller 110 makes corresponding pages in which separate device physical addresses are stored into free pages (e.g., deallocates the consecutive pages corresponding to different device physical addresses, etc.), and allocates new free pages (e.g., free consecutive pages) to store each of the separate device physical addresses. Additionally, or alternatively, the memory controller 110 may allocate free pages and store device physical address sets in the allocated pages. Referring to FIG. 4, for example, the memory controller 110 may allocate at least one free page FPG corresponding to a storage space of 3 KB to the third device physical address set DPAS3 and may store the third device physical address set DPAS3 in the newly allocated page. However, even according to the above-described example, because the existing storage space (e.g., pages) in which the third device physical address set DPAS3 of 2 KB is stored in the first write operation WRITE1 becomes a garbage region, resources of the memory device 100 may be wasted. Accordingly, an address mapping table entry for reducing a garbage region may be desired and/or required.

Figure 5:
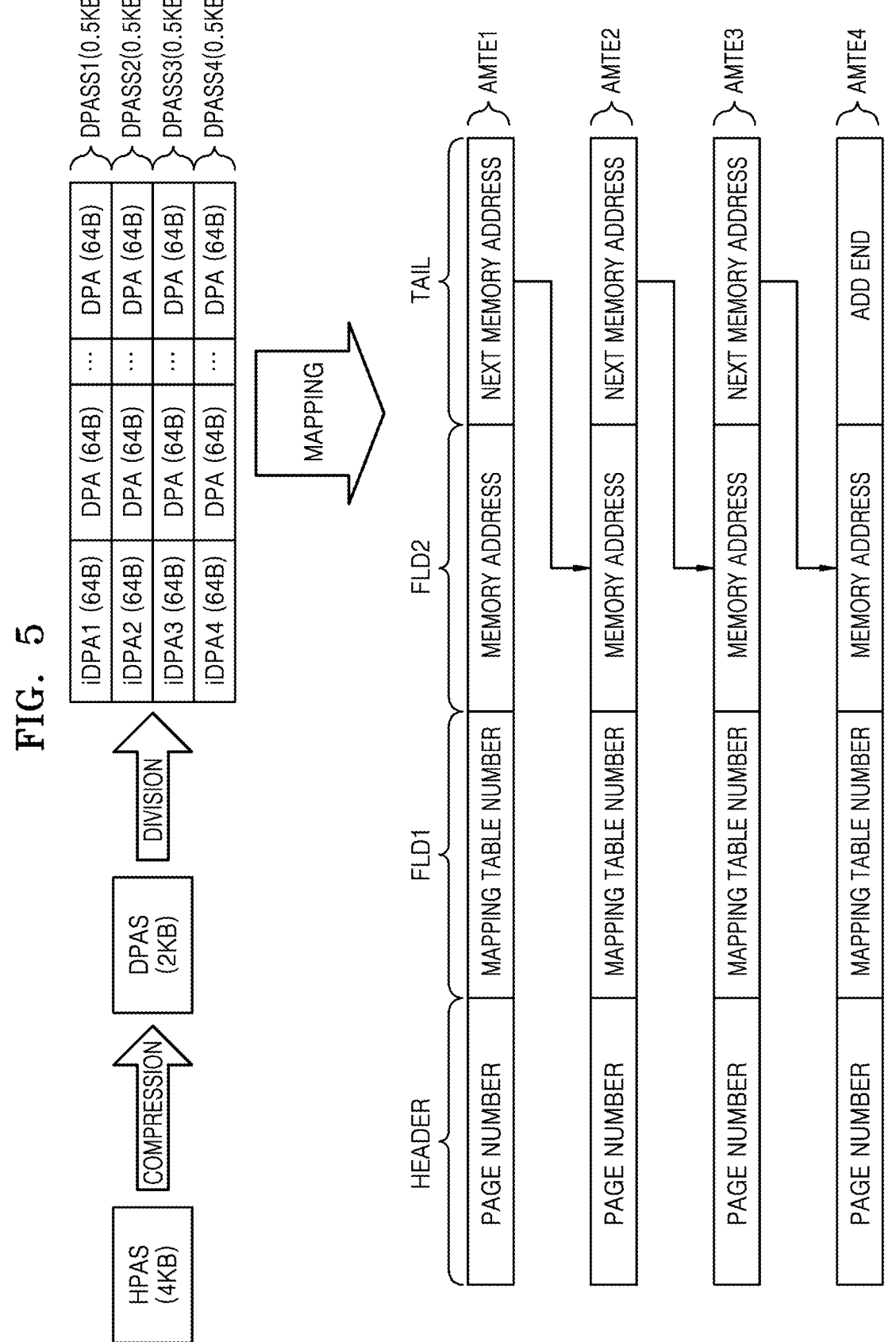
FIG. 5 is a diagram illustrating address mapping table entries according to at least one example embodiment.

FIG. 5 is a diagram illustrating address mapping table entries according to at least one example embodiment.

Referring to FIGS. 1 and 5, in at least one example embodiment, the memory controller 110 may convert a host physical address set HPAS of 4 KB into a device physical address set DPAS of 2 KB, but is not limited thereto. In this regard, the size of the host physical address set HPAS and/or the device physical address set DPAS are examples only and other size values may be used. For example, the memory controller 110 may divide the device physical address set DPAS of 2 KB into, e.g., first to fourth device physical address subsets DPASS1, DPASS2, DPASS3, and DPASS4, wherein each subset has a size of 0.5 KB, but the example embodiments are not limited thereto. In this regard, the size and number of device physical address subsets DPASS are examples and other size and/or number values may be used. Each of the first to fourth device physical address subsets DPASS1, DPASS2, DPASS3, and DPASS4 may include device physical addresses DPA each having a size of 64 B. In this regard, the size of the device physical address DPA is an example and other size values may be used. The device physical address DPA may correspond to, for example, a storage space of the second main memory 130. The device physical addresses DPA included in each device physical address subset may be read sequentially. Device physical addresses iDPA1, iDPA2, iDPA3, and iDPA4 included in the first to fourth device physical address subsets DPASS1, DPASS2, DPASS3, and DPASS4 may each be a first address to be read in each device physical address subset. The device physical addresses iDPA1, iDPA2, iDPA3, and iDPA4 may each be referred to as an initial device physical address and/or a start device physical address, etc.

The memory controller 110 may define and/or discretely define mapping granularities and then generate address mapping table entries in a size less than the size of the device physical address set DPAS, but is not limited thereto. For example, the memory controller 110 may generate first to fourth address mapping table entries AMTE1, AMTE2, AMTE3, and AMTE4 based on the first to fourth device physical address subsets DPASS1, DPASS2, DPASS3, and DPASS4, but is not limited thereto. The number of address mapping table entries and the number of device physical address subsets may be the same. An address mapping table may include a plurality of address mapping table entries (e.g., the first to fourth address mapping table entries AMTE1, AMTE2, AMTE3, and AMTE4, etc.).

Each of the first to fourth address mapping table entries AMTE1, AMTE2, AMTE3, and AMTE4 may include a header, a first field FLD1, a second field FLD2, and/or a tail (e.g., a tail pointer, etc.), but are not limited thereto.

The header may include information indicating the number of pages allocated to the respective DPASS among a plurality of pages of the first main memory 120. For example, the headers of the first to fourth address mapping table entries AMTE1, AMTE2, AMTE3, and AMTE4 may include values indicating the same or different page numbers based on the number of pages allocated to the DPASS associated with the first to fourth address mapping table entries. Additionally, or alternatively, the header may include information indicating a deallocation of a page corresponding to the respective DPASS. Here, deallocation may refer to making an allocated page free, etc.

The first field FLD1 may include values of a mapping table number corresponding to a host physical address set. For example, because the first to fourth address mapping table entries AMTE1, AMTE2, AMTE3, and AMTE4 are generated based on the same device physical address set, values of the first fields FLD1 of the first to fourth address mapping table entries AMTE1, AMTE2, AMTE3, and AMTE4 may be the same, but the example embodiments are not limited thereto.

The second field FLD2 may include values (e.g., memory addresses, etc.) of a device physical address subset stored in an allocated page. For example, the second field FLD2 of the first address mapping table entry AMTE1 may include values of the first device physical address subset DPASS1. For example, the second field FLD2 of the second address mapping table entry AMTE2 may include values of the second device physical address subset DPASS2. For example, the second field FLD2 of the third address mapping table entry AMTE3 may include values of the third device physical address subset DPASS3. For example, the second field FLD2 of the fourth address mapping table entry AMTE4 may include values of the fourth device physical address subset DPASS4.

The tail (e.g., tail pointer, etc.) may include information indicating an initial device physical address in the first memory of another (e.g., a second, a subsequent, etc.) device physical address subset to be read after the current device physical address subset. For example, the tail of the first address mapping table entry AMTE1 may include a pointer indicating a value (e.g., address in the first main memory, etc.) of the device physical address iDPA2 of the second device physical address subset DPASS2. For example, the tail of the second address mapping table entry AMTE2 may include a pointer indicating a value (e.g., address in the first main memory, etc.) of the device physical address iDPA3. For example, the tail of the third address mapping table entry AMTE3 may include a pointer indicating a value (e.g., address in the first main memory, etc.) of the device physical address iDPA4. Additionally, or alternatively, the tail may include information indicating an end address ADD END in the first memory of the device physical address set DPAS. The end address ADD END of the device physical address set DPAS may mean that there are no more device physical address subsets to be read. For example, the tail of the fourth address mapping table entry AMTE4 may include information indicating the end address ADD END in the first main memory of the device physical address set DPAS.

According to the at least one example embodiment, by linking address mapping table entries to each other, an amount of memory space taken by a garbage region may be reduced, thereby increasing, improving, and/or securing a storage space of a memory, etc.

Figure 6:
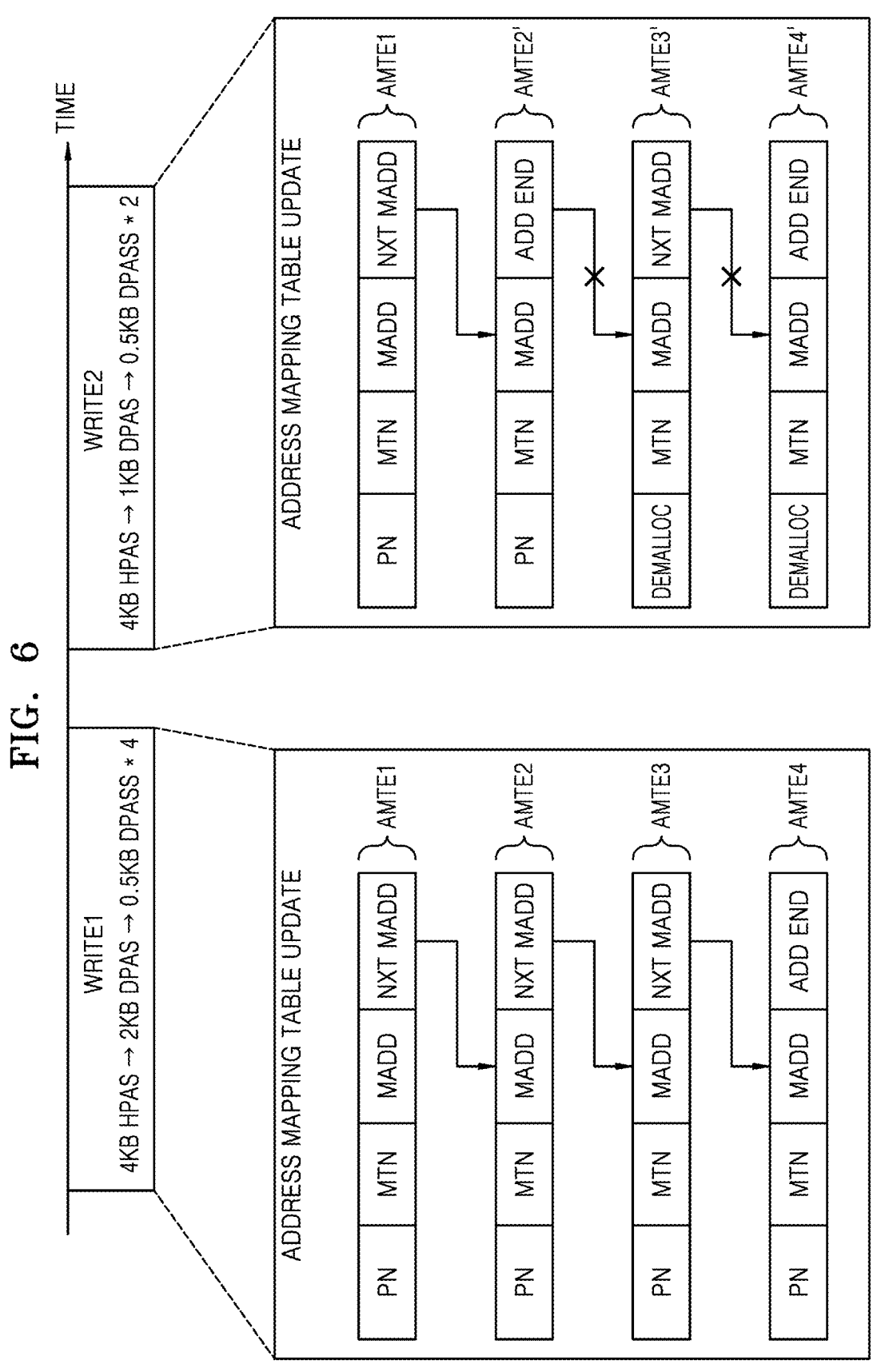
FIGS. 6 and 7 are diagrams illustrating updating an address mapping table according to at least one example embodiment.
Figure 7:
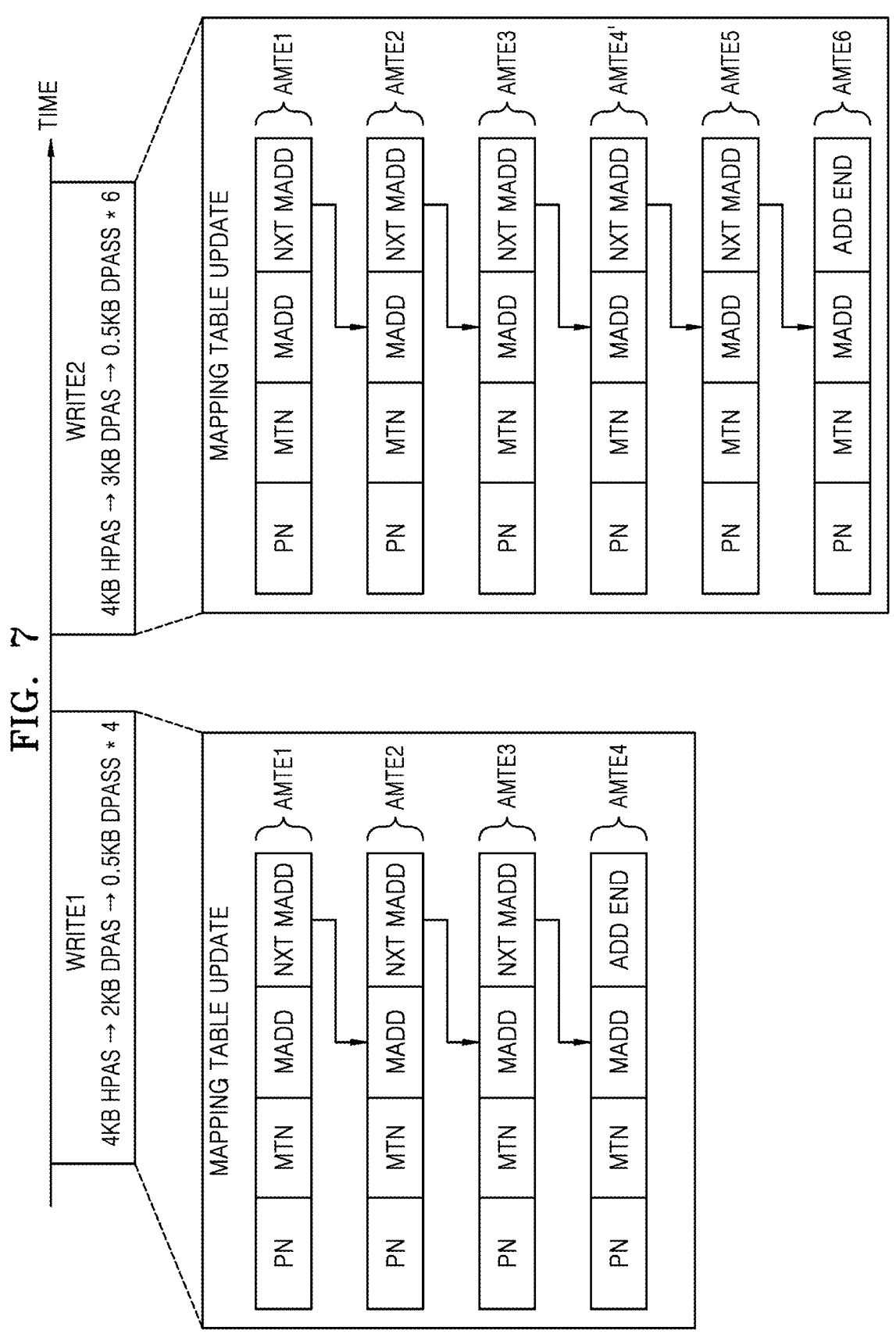

FIGS. 6 and 7 are diagrams illustrating example methods for updating an address mapping table according to at least one example embodiment. In detail, FIG. 6 is a diagram illustrating an example method of updating an address mapping table when a first compression size of a previous write operation is greater than a second compression size of a next write operation, or in other words, a first compression ratio corresponding to a first write operation is less than a second compression ratio corresponding to a second write operation, according to at least one example embodiment. FIG. 7 is a diagram illustrating an example method of updating an address mapping table when the first compression size is less than the second compression size according to at least one example embodiment.

Referring to FIG. 6, in a first write operation WRITE1, a host physical address set HPAS of 4 KB may be converted into a device physical address set DPAS of 2 KB, but the example embodiments are not limited thereto. The device physical address set DPAS of 2 KB may be divided into units of 0.5 KB to generate four device physical address subsets DPASS, but is not limited thereto. A plurality of mapping table entries, e.g., first to fourth address mapping table entries AMTE1, AMTE2, AMTE3, and AMTE4, etc., may be generated based on the four device physical address subsets DPASS. It is assumed that the first to fourth address mapping table entries AMTE1, AMTE2, AMTE3, and AMTE4 are the same as those described above with reference to FIG. 5, but the example embodiments are not limited thereto. For example, the tail (e.g., tail pointer) of the first address mapping table entry AMTE1 may indicate a value of (e.g., point to) the device physical address iDPA2, the tail of the second address mapping table entry AMTE2 may indicate a value of (e.g., point to) the device physical address iDPA3, and the tail of the third address mapping table entry AMTE3 may indicate a value of (e.g., point to) the device physical address iDPA4, etc.

In a second write operation WRITE2, the host physical address set HPAS of 4 KB may be converted into a device physical address set DPAS of 1 KB, but is not limited thereto. The device physical address set DPAS of 1 KB may be divided into units of 0.5 KB to generate two device physical address subsets DPASS, but is not limited thereto. In this case, two address mapping table entries may be desired and/or required. In at least one example embodiment, the memory controller 110 may update the address mapping table by writing information indicating deallocation DEMALLOC to the header of each of the third and fourth address mapping table entries AMTE3 and AMTE4, or in other words, the memory controller 110 may indicate that the DPASSes corresponding to the third and fourth AMTE3 and AMTE4 address mapping table entries are being deallocated, but is not limited thereto. Also, the memory controller 110 may update the address mapping table by writing information indicating an end address ADD END of the device physical address set DPAS to the tail of the second address mapping table entry AMTE2, but the example embodiments are not limited thereto. Because the headers of the updated third and fourth address mapping table entries AMTE3' and AMTE4' each indicate the deallocation DEMALLOC, the link between the updated third and fourth address mapping table entries AMTE3' and AMTE4' may be broken and/or may be garbage, etc. Because the tail of the updated second address mapping table entry AMTE2' includes information indicating the end address ADD END of the device physical address set DPAS, the link between the updated second and third address mapping table entries AMTE2' and AMTE3' may be broken, etc.

Referring to FIG. 7, the first write operation WRITE1 is the same as that in FIG. 6, and thus, redundant descriptions thereof are omitted. In the second write operation WRITE2, the host physical address set HPAS of 4 KB may be converted into a device physical address set DPAS of 3 KB, but the example embodiments are not limited thereto. The device physical address set DPAS of 3 KB may be divided into units of 0.5 KB to generate six device physical address subsets DPASS, but the example embodiments are not limited thereto. In this case, six address mapping table entries may be desired and/or required. In at least one example embodiment, the memory controller 110 may update the address mapping table by writing a pointer NXT MADD indicating the next initial device physical address to the tail of the fourth address mapping table entry AMTE4. The pointer NXT MADD written in the tail of the updated fourth address mapping table entry AMTE4' may indicate an initial device physical address (not shown) of a fifth device physical address subset (not shown) to be read after the fourth device physical address subset DPASS4 of FIG. 5, etc., but the example embodiments are not limited thereto. The memory controller 110 may update the address mapping table by additionally generating fifth and sixth address mapping table entries AMTE5 and AMTE6, but is not limited thereto. For example, the memory controller 110 may allocate pages for storing the fifth and sixth address mapping table entries AMTE5 and AMTE6 by writing page numbers PN to headers of the fifth and sixth address mapping table entries AMTE5 and AMTE6, etc. The memory controller 110 may write the pointer NXT MADD to a tail of the fifth address mapping table entry AMTE5 and write information indicating the end ADD END of the device physical address set DPAS to a tail of the sixth address mapping table entry AMTE6. The address mapping table entries (e.g., AMTE1, AMTE2, AMTE3, AMTE4', AMTE5, and AMTE6) in the second write operation WRITE2 may be linked to each other.

According to the at least one example embodiment, a garbage region may be reduced (e.g., a size of the garbage region may be reduced, etc.) by linking address mapping table entries to each other.

Figure 8:
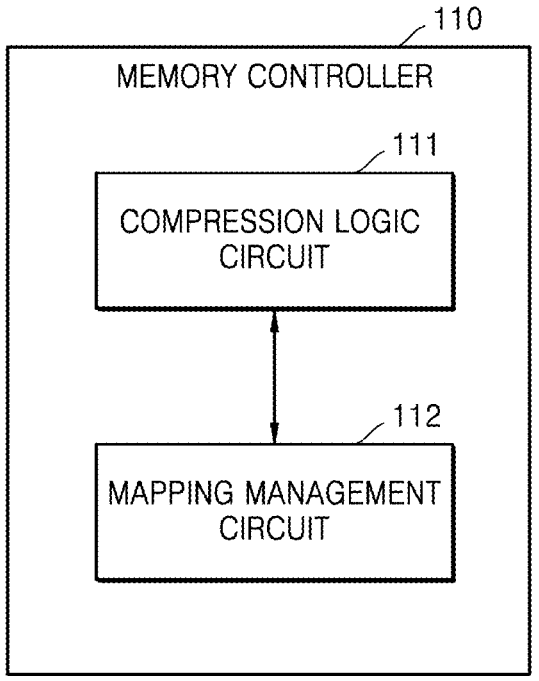
FIG. 8 is a block diagram of a memory controller according to at least one example embodiment.

FIG. 8 is a block diagram of the memory controller 110 according to at least one example embodiment.

Referring to FIG. 8, in at least one example embodiment, the memory controller 110 may include a compression logic circuit 111 and/or a mapping management circuit 112, etc., but is not limited thereto. According to some example embodiments, the memory controller 110, the compression logic circuit 111, and/or the mapping management circuit 112, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The compression logic circuit 111 may compress desired data. In at least one example embodiment, the compression logic circuit 111 may compress a host physical address set of a first size (e.g., a first desired size, etc.) into a device physical address set of a second size (e.g., a second desired size, etc.). In at least one example embodiment, the compression logic circuit 111 may divide the device physical address set into a plurality of device physical address subsets of the same size, but is not limited thereto. The at least one example embodiment is the same or substantially the same as the at least one example embodiment described in connection with FIGS. 3 and 5, but the example embodiments are not limited thereto.

The mapping management circuit 112 may manage an address mapping table, but is not limited thereto. In at least one example embodiment, the mapping management circuit 112 may generate an address mapping table entry based on a device physical address subset, etc. The at least one example embodiment is the same as and/or similar to the at least one example embodiment described above in connection to FIG. 5, but is not limited thereto. In at least one example embodiment, the mapping management circuit 112 may update an address mapping table entry based on a device physical address subset, but is not limited thereto. The at least one example embodiment is the same as or similar to the at least one example embodiment described above with reference to FIGS. 6 and 7, but is not limited thereto.

Although not shown, in at least one example embodiment, the memory controller 110 may further include the first main memory 120, etc.

Figure 9:
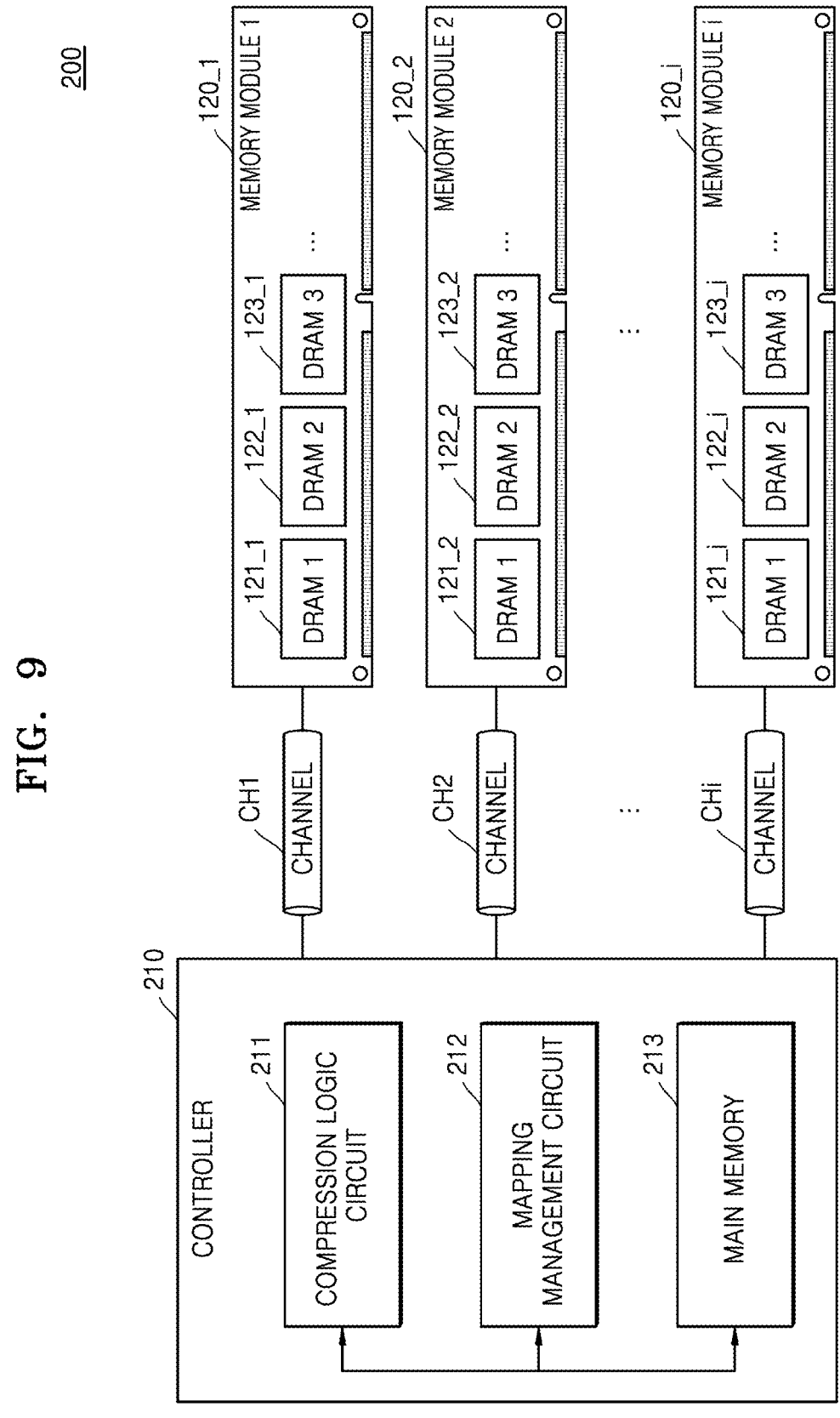
FIG. 9 is a diagram illustrating a memory device according to at least one example embodiment.

FIG. 9 is a diagram illustrating a memory device 200 according to at least one example embodiment.

Referring to FIG. 9, the memory device 200 may include a controller 210 and at least one memory module, etc., but is not limited thereto.

In at least one example embodiment, the controller 210 may include a compression logic circuit 211, a mapping management circuit 212, and/or a main memory 213, etc., but is not limited thereto. The compression logic circuit 211 and the mapping management circuit 212 may be the same as the compression logic circuit 111 and the mapping management circuit 112 described in connection with FIG. 8, but are not limited thereto. The main memory 213 may be the same as the first main memory 120 of FIG. 1, but is not limited thereto. According to some example embodiments, the controller 210, the compression logic circuit 211, the mapping management circuit 212, and/or the main memory 213, etc., may be implemented as processing circuitry.

One or more memory modules may be connected to the controller 210 through at least one channel. The number of memory modules connected to the controller 210 through a single channel may be one or more. The memory modules may be divided into a single in-line memory module (SIMM) having a structure in which tabs are formed on one side, and/or a dual in-line memory module (DIMM) having a structure in which tabs are formed on both sides. For example, first to ith memory modules 120_1, 120_2, . . . , and 120_i shown in FIG. 9 may each be implemented as a DIMM, wherein i may be an integer of 2 or more, but the example embodiments are not limited thereto.

In some example embodiments, the memory device 200 may include two or more memory modules, but the example embodiments of the inventive concepts are not limited thereto. Referring to FIG. 9, for example, the memory device 200 may include the first to ith memory modules 120_1, 120_2, . . . , and 120_i. The first memory module 120_1 may be connected to the controller 210 through a first channel CH1, the second memory module 120_2 may be connected to the controller 210 through a second channel CH2, and the ith memory module 120_i may be connected to the controller 210 through an ith channel CHi, etc. Each of the first to ith memory modules 120_1, 120_2, . . . , and 120_i may include a plurality of DRAM chips. For example, the first memory module 120_1 may include a plurality of DRAM chips 121_1, 122_1, 123_1, . . . , the second memory module 120_2 may include a plurality of DRAM chips 121_2, 122_2, 123_2, . . . , and the ith memory module 120_i may include a plurality of DRAM chips 121_i, 122_i, 123_i, . . . .

In FIG. 9, the main memory 213 may be included in the controller 210. However, unlike what is shown in FIG. 9, in other example embodiments, the main memory 213 may not be included in the controller 210 and instead may be externally connected to the controller 210 through at least one bus, etc.

Figure 10:
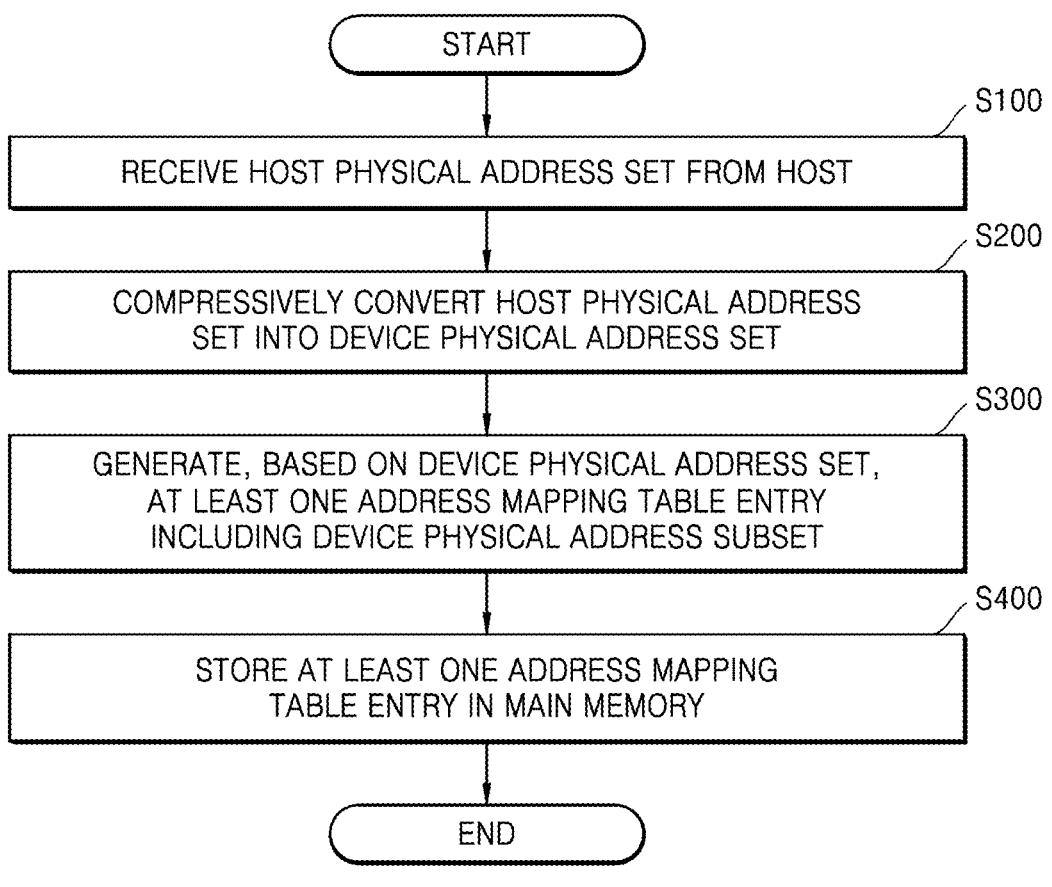
FIG. 10 is a flowchart illustrating an operating method of a memory device according to at least one example embodiment.

FIG. 10 is a flowchart illustrating an example operating method of a memory device according to at least one example embodiment.

Referring to FIG. 10, operation S100 may include receiving, by the memory controller 110, a host physical address set (e.g., a host physical address range, etc.) from the host 10.

Operation S200 may include compressively converting, by the memory controller 110, the host physical address set into a device physical address set (e.g., a device physical address range, etc.).

Operation S300 may include generating, by the memory controller 110, based on the device physical address set, at least one address mapping table entry including a device physical address subset (e.g., including a device physical address subrange, etc.). In at least one example embodiment, the at least one address mapping table entry may include a header indicating the number of allocated pages or the deallocation of page(s) corresponding to the DPASS allocated among a plurality of pages, a mapping table number corresponding to the host physical address set, a device physical address subset corresponding to the DPASS stored in the associated pages, and/or a tail (e.g., a tail pointer, etc.) indicating an initial device physical address of another and/or next device physical address subset to be read after the one device physical address subset and/or an end of the device physical address set, etc., but the example embodiments are not limited thereto.

In at least one example embodiment, the operating method of FIG. 10 may further include operation S400 of storing, by the memory controller 110, the at least one address mapping table entry in a main memory (e.g., the first main memory 120).

Figure 11:
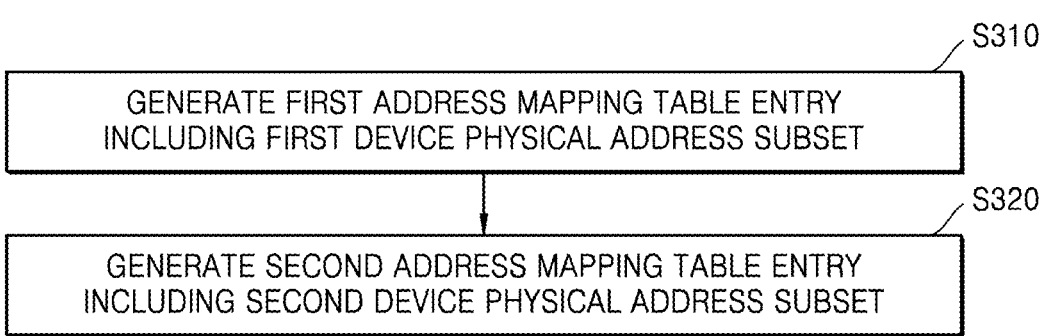
FIG. 11 is a flowchart of the operating method of FIG. 10 according to at least one example embodiment.

FIG. 11 is a flowchart of the operating method of FIG. 10 according to at least one example embodiment. The at least one example embodiment of FIG. 11 may be the same and/or similar to the at least one example embodiment described in connection with FIG. 5, but the example embodiments are not limited thereto.

Referring to FIG. 11, operation S300 of FIG. 10 may include operation S310 and operation S320, but is not limited thereto.

In operation S310, the memory controller 110 may generate at least a first address mapping table entry including at least a first device physical address subset, but is not limited thereto. The first address mapping table entry may include a header indicating the number of pages allocated to a first DPASS among the plurality of pages, a first mapping table number, the first device physical address subset, and/or a tail (e.g., a tail pointer, etc.) indicating an initial device physical address in the first memory of a second device physical address subset (e.g., a next device physical address subset, a subsequent device physical address subset, etc.), etc.

In operation S320, the memory controller 110 may generate a second address mapping table entry including the second device physical address subset, but is not limited thereto. The second address mapping table entry may include a header indicating the number of pages allocated to the second DPASS, the second mapping table number, the second device physical address subset, and/or a tail indicating the end of the device physical address set, but is not limited thereto.

Figure 12:
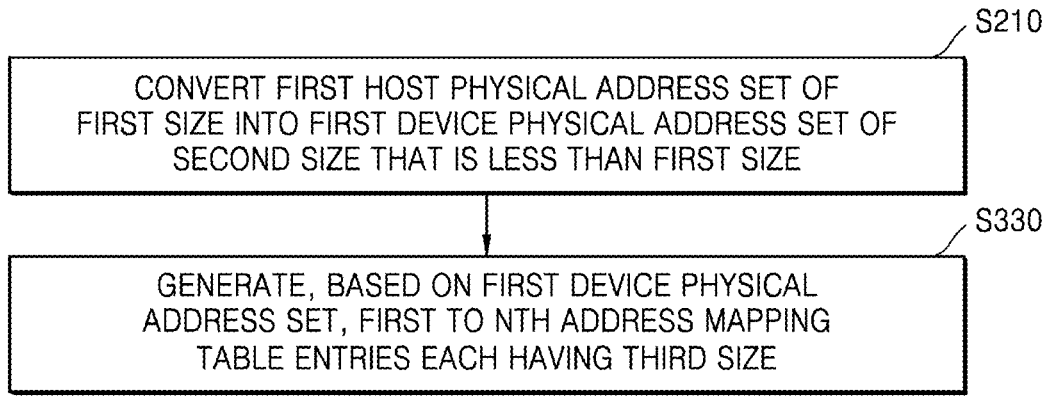
FIG. 12 is a flowchart of the operating method of FIG. 10 according to at least one example embodiment.

FIG. 12 is a flowchart of the operating method of FIG. 10 according to at least one example embodiment. The at least one example embodiment of FIG. 12 may be the same and/or similar to the at least one example embodiment described in connection to FIG. 5, but the example embodiments are not limited thereto.

Referring to FIG. 12, operation S200 may include operation S210, and operation S300 may include operation S330, but the example embodiments are not limited thereto.

In operation S210, the memory controller 110 may convert (and/or compress) a first host physical address set of a first size (e.g., a first desired size, etc.) into a first device physical address set of a second size that is less than the first size.

In operation S330, the memory controller 110 may generate, based on the first device physical address set, first to nth address mapping table entries each having a third size, wherein n may be (second size/third size), but the example embodiments are not limited thereto.

Figure 13:
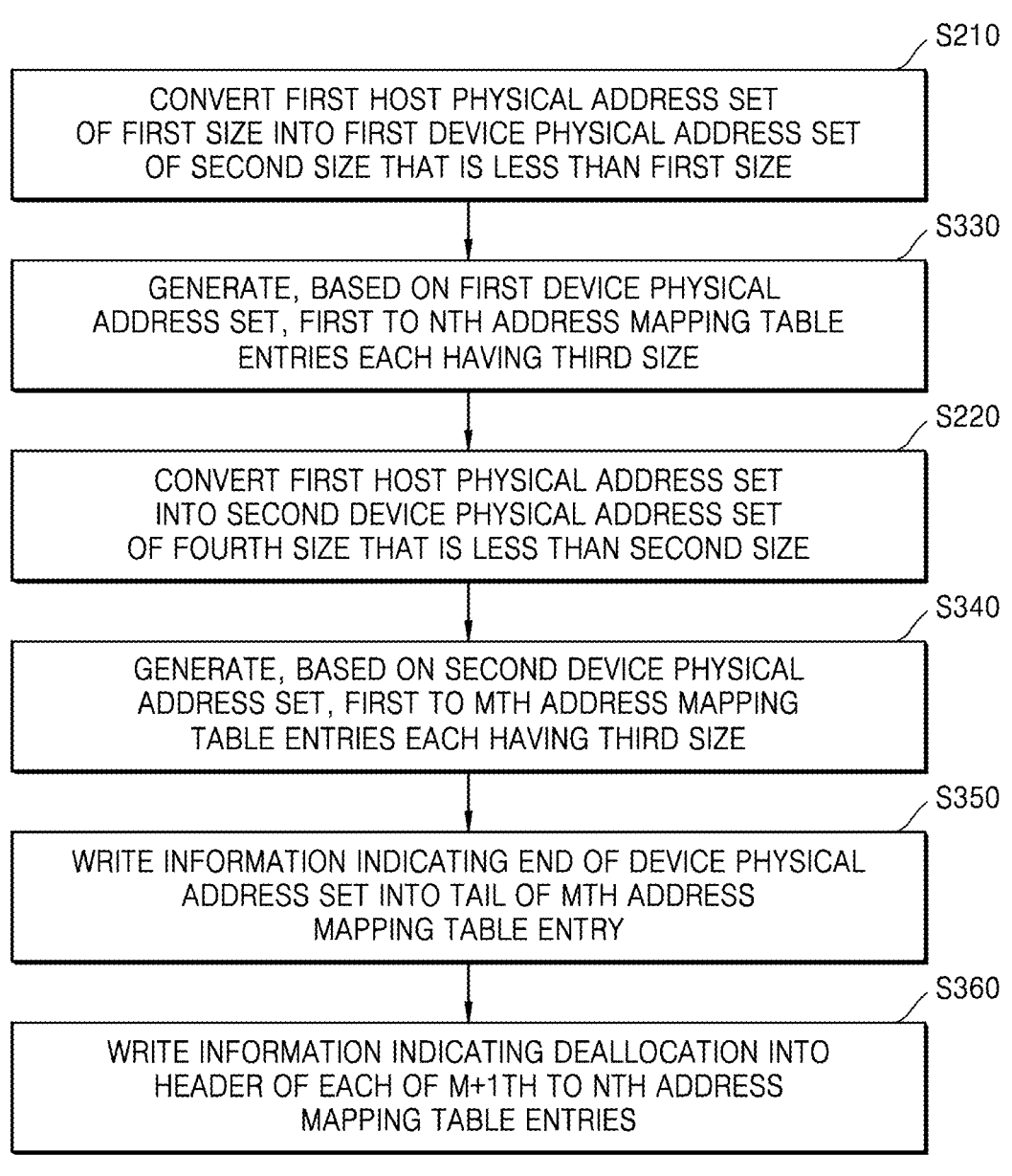
FIG. 13 is a flowchart of the operating method of FIG. 10 according to at least one example embodiment.

FIG. 13 is a flowchart of the operating method of FIG. 10 according to at least one example embodiment. The at least one example embodiment of FIG. 13 may be the same and/or similar to the at least one example embodiment described in connection with FIG. 6, but the example embodiments are not limited thereto.

Referring to FIG. 13, operation S200 may include operation S210 and operation S220, and operation S300 may include operation S330, operation S340, operation S350, and operation S360, but the example embodiments are not limited thereto.

After operation S330, in operation S220, the memory controller 110 may convert the first host physical address set into a second device physical address set of a fourth size that is less than the second size, but is not limited thereto.

After operation S220, in operation S340, the memory controller 110 may generate, based on the second device physical address set, first to mth address mapping table entries each having the third size, wherein m may be (fourth size/third size), and may be less than n, but is not limited thereto.

After operation S340, in operation S350, the memory controller 110 may write information indicating the end of the device physical address set to a tail of the mth address mapping table entry, etc.

After operation S350, in operation S360, the memory controller 110 may write information indicating the deallocation of the pages allocated to the device physical address subset DPASS associated with the respective address mapping table entry to a header of each of the m+1th to nth address mapping table entries.

FIG. 14 is a flowchart of the operating method of FIG. 10 according to at least one example embodiment. The at least one example embodiment of FIG. 14 may be the same as and/or similar to the at least one example embodiment described in connection to FIG. 7, but the example embodiments are not limited thereto.

Referring to FIG. 14, operation S200 may include operation S210 and operation S230, and operation S300 may include operation S330, operation S370, operation S380, and operation S390, but the example embodiments are not limited thereto.

After operation S330, in operation S230, the memory controller 110 may convert the first host physical address set into a third device physical address set of a fifth size that is less than the first size and greater than the second size, but the example embodiments are not limited thereto.

After operation S230, in operation S370, the memory controller 110 may generate, based on the third device physical address set, first to kth address mapping table entries each having the third size, wherein k may be (fifth size/third size) and may be greater than n, but is not limited thereto.

After operation S370, in operation S380, the memory controller 110 may write a page number to a header of each of n+1th to kth address mapping table entries, etc.

After operation S380, in operation S390, the memory controller 110 may write an initial device physical address of a device physical address subset included in the n+1th address mapping table entry to a tail of the nth address mapping table entry, etc.

While some example embodiments of the inventive concepts have been particularly shown and described herein, it will be understood that various changes in form and details may be made therein without departing from the spirit and scope of the following claims.

What is claimed is:

1. A memory device comprising:
   a first main memory configured to store an address mapping table;
   at least one second main memory configured to store data received from a host device; and
   a memory controller configured to,
      compressively convert a host physical address set received from the host device into a device physical address set including a plurality of device physical addresses in the at least one second main memory,
      generate at least one address mapping table entry associated with at least one device physical address subset of the device physical address set, based on the device physical address set, and
      store the at least one address mapping table entry in the address mapping table of the first main memory,
   each of the at least one address mapping table entry including,
      a header indicating a page number of an allocated page among a plurality of pages included in the first main memory or a deallocation of the allocated page,
      a mapping table number corresponding to the host physical address set,
      a current device physical address subset stored in the allocated page, and
      a tail indicating an initial device physical address of a subsequent device physical address subset to be read after the current device physical address subset or an end of the device physical address set.

2. The memory device of claim 1, wherein the memory controller is further configured to:
   divide the device physical address set into a plurality of device physical address subsets; and
   generate a plurality of mapping table entries based on the plurality of device physical address subsets.

3. The memory device of claim 1, wherein the memory controller is further configured to:
   convert a first host physical address set of a first size into a first device physical address set of a second size, the second size being smaller than the first size; and
   generate first to nth address mapping table entries based on the first device physical address set, the first to nth address mapping table entries each having a third size, wherein n is an integer greater than 1.

4. The memory device of claim 3, wherein the memory controller is further configured to:
   convert the first host physical address set into a second device physical address set of a fourth size, the fourth size being less than the second size;
   generate first to mth address mapping table entries based on the second device physical address set, the first to mth address mapping table entries each having the third size, wherein m is less than n;

update the mth address mapping table entry by writing information indicating the end of the second device physical address set to a tail of the mth address mapping table entry; and
   update an m+1th to the nth address mapping table entries by writing information indicating deallocation to headers of each of the m+1th to nth address mapping table entries.

5. The memory device of claim 3, wherein the memory controller is further configured to:
   convert the first host physical address set into a third device physical address set of a fifth size, the fifth size being less than the first size and greater than the second size;
   generate first to kth address mapping table entries based on the third device physical address set, the first to kth address mapping table entries each having the third size, wherein k is greater than n;
   allocate at least one page in the first main memory for storing n+1th to the kth address mapping table entries; and
   update the nth address mapping table entry by writing an initial device physical address of a device physical address subset included in the n+1th address mapping table entry into a tail of the nth address mapping table entry.

6. The memory device of claim 1, wherein the memory controller is further configured to:
   generate the device physical address set based on the host physical address set;
   divide the device physical address set into a plurality of device physical address subsets;
   generate the at least one address mapping table entry based on the plurality of device physical address subsets; and
   store the at least one address mapping table entry in the first main memory.

7. The memory device of claim 1, wherein the first main memory is included in the memory controller.

8. The memory device of claim 1, wherein the first main memory and the at least one second main memory are each volatile memories.

9. An operating method of a memory device, the operating method comprising:
   receiving a host physical address set from a host device;
   compressively converting the host physical address set into a device physical address set including a plurality of device physical addresses in at least one first main memory; and
   generating at least one address mapping table entry associated with at least one device physical address subset of the device physical address set, based on the device physical address set,
   each of the at least one address mapping table entry including,
      a header indicating a page number of an allocated page among a plurality of pages included in in a second main memory or a deallocation of the allocated page,
      a mapping table number corresponding to the host physical address set,
      a current device physical address subset stored in the allocated page, and
      a tail indicating an initial device physical address of a subsequent device physical address subset to be read after the current device physical address subset or an end of the device physical address set.

10. The operating method of claim 9, wherein the generating of the at least one address mapping table entry further includes:

dividing the device physical address set into a plurality of device physical address subsets; and generating a plurality of mapping table entries based on the plurality of device physical address subsets.

11. The operating method of claim 9, wherein the compressively converting the host physical address set into the device physical address set further includes, converting a first host physical address set of a first size into a first device physical address set of a second size, the second size being less than the first size; and the generating the at least one address mapping table entry further includes, generating first to nth address mapping table entries based on the first device physical address set, the first to nth address mapping table entries each having a third size, wherein n is an integer greater than 1.

12. The operating method of claim 11, wherein the compressively converting the host physical address set into the device physical address set further includes, after the generating the first to nth address mapping table entries, converting the first host physical address set into a second device physical address set of a fourth size, the fourth size being less than the second size; and the generating the at least one address mapping table entry further includes, generating first to mth address mapping table entries based on the second device physical address set, the first to mth address mapping table entries each having the third size, writing information indicating the end of the second device physical address set to a tail of the mth address mapping table entry, and writing information indicating deallocation to headers of each of m+1th to nth address mapping table entries, wherein m is less than n.

13. The operating method of claim 11, wherein the compressively converting the host physical address set into the device physical address set further includes, after the generating the first to nth address mapping table entries, converting the first host physical address set into a third device physical address set of a fifth size, the fifth size being less than the first size and greater than the second size; and the generating the at least one address mapping table entry further includes, generating first to kth address mapping table entries based on the third device physical address set, the first to kth address mapping table entries each having the third size, writing information indicating a number of pages allocated to device physical address subsets associated with n+1th to kth address mapping table entries into headers of each of the n+1th to kth address mapping table entries, and writing an initial device physical address of the device physical address subset included in the n+1th address mapping table entry to a tail of the nth address mapping table entry, wherein k is greater than n.

14. The operating method of claim 9, further comprising:

storing the at least one address mapping table entry in the second main memory.

15. A memory device comprising:

at least one memory module connected to a channel; and a controller including a main memory, the main memory configured to store an address mapping table, the controller configured to, compressively convert a host physical address set received from a host device into a device physical address set including a plurality of device physical addresses in the main memory, generate at least one address mapping table entry associated with at least one device physical address subset of the device physical address set, based on the device physical address set, and store the at least one address mapping table entry in the main memory, each of the at least one address mapping table entry including, a header indicating a page number of an allocated page among a plurality of pages included in in the main memory or a deallocation of the allocated page, a mapping table number corresponding to the host physical address set, a current device physical address subset stored in the allocated page, and a tail indicating an initial device physical address of a subsequent device physical address subset to be read after the current device physical address subset or an end of the device physical address set.

16. The memory device of claim 15, wherein the controller is further configured to:

divide the device physical address set into a plurality of device physical address subsets; and generate a plurality of address mapping table entries based on the plurality of device physical address subsets.

17. The memory device of claim 15, wherein the controller is further configured to:

convert a first host physical address set of a first size into a first device physical address set of a second size, the second size being less than the first size; and generate first to nth address mapping table entries based on the first device physical address set, the first to nth address mapping table entries each having a third size, wherein n is an integer greater than 1.

18. The memory device of claim 17, wherein the controller is further configured to:

convert the first host physical address set into a second device physical address set of a fourth size, the fourth size being less than the second size;

generate first to mth address mapping table entries based on the second device physical address set, the first to mth address mapping table entries each having the third size, wherein m is less than n;

update the mth address mapping table entry by writing information indicating the end of the second device physical address set to a tail of the mth address mapping table entry; and update an m+1th to the nth address mapping table entries by writing information indicating deallocation to headers of each of the m+1th to nth address mapping table entries.

19. The memory device of claim 17, wherein the controller is further configured to:

convert the first host physical address set into a third device physical address set of a fifth size, the fifth size being less than the first size and greater than the second size;

generate first to kth address mapping table entries based on the third device physical address set, the first to kth address mapping table entries each having the third size, wherein k is greater than n;

allocate at least one page in the main memory for storing n+1th to the kth address mapping table entries; and update the nth address mapping table entry by writing an initial device physical address of a device physical address subset included in the n+1th address mapping table entry to a tail of the nth address mapping table entry.

20. The memory device of claim 15, wherein the at least one memory module comprises at least one volatile memory; and the main memory comprises the at least one volatile memory.

* * * * *